United States Patent Office 3,074,558
Patented Jan. 22, 1963

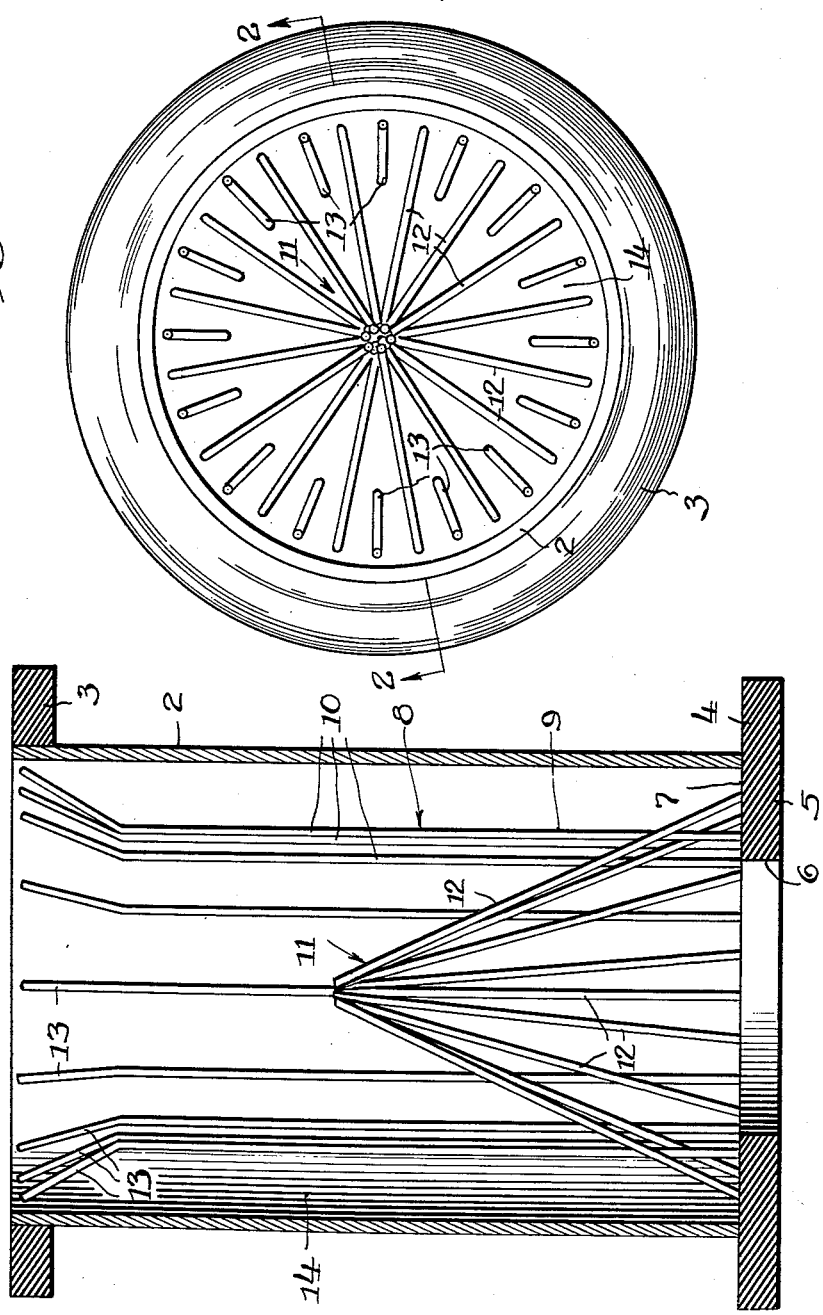

3,074,558
STRAINER
Raymond J. Huntowski, Chicago, Ill., assignor to
FMC Corporation, a corporation of Delaware
Filed Feb. 11, 1959, Ser. No. 792,493
4 Claims. (Cl. 210—299)

This invention relates to a strainer adapted for use in connection with the sewage inflow to a wet well, and is particularly concerned with means for preventing such strainers from being clogged.

Although the strainer may be used in many different fields, it is specifically designed for sewage inflow into a wet well from which the sewage liquid is pumped when the liquid level attains at predetermined height, and will be described in connection with said use.

In sewage systems provided with a wet well for the accumulation of liquid it is customary to use one or more conduit sections for both the inflow and the discharge conduit. The pump is idle during the inflow cycle and the liquid sewage carries various solids through the conduit. When the mixture of liquid and solids reach the strainer, the solids are intercepted by the strainer, and the liquid flows through the strainer to the wet well.

Liquid sewage often contains rags and various paper products, such as, for example, toilet paper, diapers, napkins, hand towels and paper used in sanitary napkins. These solids have a tendency to become draped over the strainer and to clog it so as to impair or stop the flow of liquid through the strainer. This problem has become more acute in recent years with the advent of high wet strength papers which do not disintegrate readily even when wet.

In accordance with the present invention, the strainer, which is so positioned in the conduit that all the liquids flowing through the conduit must pass through the strainer before they can flow into the wet well, is designed to retain the solids in the strainer in spaced relationship to the inner wall surface of the conduit. The strainer comprises a foraminated wall in the form of an inner receptacle comprising generally parallel rods in spaced parallel relationship to the inner wall surface of the conduit and foraminated means extending from a line exterior of said rods inwardly between the rods and upwardly to constitute a bottom for said receptacle adapted to cooperate with said foraminated wall to hold intercepted solids. The liquid flowing through the conduit by-passes the intercepted solids by flowing through the space provided between the foraminated wall of the receptacle and the inner wall surface of the conduit. The liquid flowing through said space passes through the strainer so that its solids can be intercepted before it enters said space.

The conduit is provided with an internal annular shoulder upon which the strainer is mounted, and the liquid passing through the strainer flows through the opening defined by the shoulder into the wet well or into another conduit section that leads to the wet well. The solids which are retained in the strainer are allowed to accumulate as long as the inflow cycle continues. The strainer is designed to hold all the solids that accumulate during the inflow cycle without allowing them to extend outwardly beyond the confines of the foraminated wall portion which is spaced from the inner wall surface of the conduit. The bottom of the foraminated receptacle is spaced above the shoulder to provide a passageway for the liquid to flow below the bottom of the receptacle and through the opening defined by the internal shoulder in the conduit.

When the liquid level in the wet well reaches a predetermined level, the pump starts operating and reverses the flow of liquid through the conduit sections which serve for discharge as well as inflow of sewage. A check valve closes the portion of the conduit used exclusively for inflow, and the discharge is directed toward the outlet. As the liquid is pumped through the strainer it carries all the solids accumulated therein to the outlet along with the liquid discharge. The pump is set to start operating at a level low enough so that the strainer never gets completely filled with the intercepted solids. If the intercepted solids come too close to filling the strainer before the pump starts, the condition may be corrected by replacing the strainer with a strainer of larger capacity, or by adjusting the level of pump operation so that the pump starts to operate at a lower liquid level.

The structure by means of which the above mentioned and other advantages of the invention are attained will be described in the following specification, taken in conjunction with the accompanying drawings showing two preferred illustrative embodiments of the invention, in which:

FIG. 1 is a top plan view of one embodiment of the invention; and

FIG. 2 is a cross sectional view, taken along the line 2—2 of FIG. 1.

Referring to FIGS. 1 and 2 of the drawing, the reference numeral 2 indicates a conduit section having an outwardly extending annular flange 3 at its upper edge and a second annular flange 4 at its lower edge for facilitating securement of the conduit section to other conduit sections. A flange 5, which may be integral with flange 4, extends inwardly of the lower edge of the conduit section to provide an opening 6 and an annular internal shoulder 7 which serves to support a strainer. Conduit section 2 forms part of a conduit in a sewage system and is adapted to be inserted in the system in such position that it is used for both inflow and discharge of the sewage, the direction of flow being reversed for each cycle.

A strainer 8, constructed in accordance with one embodiment of the invention, comprises a foraminated wall in the form of a cylindrical casing 9 formed of a group of rods 10 and having a diameter larger than the diameter of opening 6. Rods 10 are arranged circumferentially of conduit section 2 in uniformly spaced relationship to the inner wall surface of the conduit section. The lower end of each rod is preferably embedded in flange 5, but the rods may be secured in place in any suitable manner. The spacing between rods 10 is uniform, and is sufficiently close to prevent solids of greater than a predetermined minimum size from passing between said rods.

Strainer 8 also includes foraminated means in the form of a cone 11 formed of a group of rods 12 the lower ends of which are preferably embedded in flange 5. The base of cone 11 has circumference larger than the circumference of the base of casing 9, and rods 12, which converge upwardly to provide the conical shape, extend through the spaces between rods 10 to position the apex of the cone within the confines of casing 9. The portion of casing 9 above the plane of intersection between rods 10 and 12 constitutes the foraminated side walls of an inner receptacle for holding solids intercepted by the rods from liquid sewage flowing through conduit section 2. The upper portion of cone 11 above the plane of intersection between rods 10 and 12 constitutes the foraminated bottom of said inner receptacle. The bottom of the inner receptacle is supported by the lower portions of rods 12 extending upwardly from shoulder 7 to the plane of intersection.

The upper end of each rod 10 extends outwardly, as indicated at 13, to engage the inner wall surface of conduit section 2 so that all liquids flowing through the conduit section must pass through the strainer. The rods prevent any solids of a size greater than a predetermined minimum from flowing with the liquid sewage into the space between casing 9 and the inner wall surface of the conduit section.

During the inflow cycle, liquid sewage, carrying various solids with it, enters the upper end of conduit section 2, as viewed in FIG. 2. The outwardly extending upper ends 13 of rods 10 intercept some of the solids and direct them inwardly into casing 9. These solids, along with the solids that pass directly into the casing, flow into engagement with rods 12 along with the liquid flowing within the confines of the casing. The liquid within the conduit, but outside the confines of the inner receptacle, flows between the ends 13 of rods 10 into the space 14 between the outer surface of the inner receptacle and the inner wall surface of conduit section 2. The solids, intercepted by rods 12 build up from the intersection between rods 10 and 12 until they completely fill the inner receptacle to a level above the upper end of cone 11. As soon as cone 11 is completely covered by the solids the passage of liquids through the casing is blocked, and liquids flowing into the upper open end of casing 9 pass outwardly through the spaces between rods 10 into the space 14. The liquids by-pass the intercepted solids by flowing through space 14, and then flow through the spaces between rods 10 and 12 below the bottom of the inner receptacle, in which the solids are retained, to reach opening 6.

The inflow cycle is regulated so as to terminate before the solids reach a level above the plane at the base of rod sections 13. As soon as the inflow cycle stops, a pump reverses the flow of liquid and pumps it back through conduit section 2 to the discharge outlet. During this reverse movement, the liquid carries the solids from the strainer along with it to the discharge outlet, thereby cleaning the conduit section for the next inflow cycle.

Although I have described a preferred embodiment of the invention in considerable detail, it will be understood that the description is intended to be illustrative, rather than restrictive, as many details may be modified or changed, without departing from the spirit or scope of the invention. Accordingly, I do not desire to be restricted to the exact construction described.

I claim:

1. In combination with a conduit having an internal annular shoulder defining an opening coaxial with said conduit, a strainer secured in said conduit so that all liquid flowing through said conduit must pass through said strainer and solids carried by said liquid are intercepted thereby, said strainer including a foraminated wall portion mounted in and extending axially from said annular shoulder and spaced from and generally parallel to the inner wall surface of said conduit to provide an annular chamber therebetween, means on the end of said wall portion remote from said shoulder cooperating with said inner wall to prevent solids from entering said annular chamber, foraminated means mounted in said annular shoulder exteriorly of said wall portion and extending axially and interiorly through the end of said annular chamber adjacent said shoulder and through said foraminated wall toward the center of said conduit to a region spaced axially from said shoulder to intercept solids carried by the liquid and permit the flow of liquid therethrough, said wall portion and said foraminated means intersecting at a level spaced axially from said shoulder to confine the intercepted solids in a region therebetween which is intermediate the length of said strainer, whereby the intercepted solids are held away from said shoulder and out of said annular chamber so that liquid flowing through said conduit may flow through said annular chamber to by-pass said intercepted solids.

2. In combination with a conduit having an internal annular shoulder defining an opening coaxial with said conduit, a strainer secured in said conduit so that all liquid flowing through said conduit must pass through said strainer and solids carried by said liquid are intercepted thereby, said strainer including a foraminated wall portion comprising generally parallel rods mounted in and extending axially from said annular shoulder and spaced from and generally parallel to the inner wall surface of said conduit to provide an annular chamber therebetween, the ends of said parallel rods remote from said shoulder cooperating with said inner wall to prevent solids from entering said annular chamber, foraminated means mounted in said annular shoulder exteriorly of said wall portion and extending axially and interiorly through the end of said annular chamber adjacent said shoulder and between said parallel rods toward the center of said conduit to a region spaced axially from said shoulder to intercept solids carried by the liquid and permit the flow of liquid therethrough, said parallel rods and said foraminated means intersecting at a level spaced axially from said shoulder to confine the intercepted solids in a region therebetween which is intermediate the length of said strainer, whereby the intercepted solids are held away from said shoulder and out of said annular chamber so that liquid flowing through said conduit may flow through said annular chamber to by-pass said intercepted solids.

3. In combination with a conduit having an internal annular shoulder defining an opening coaxial with said conduit, a strainer secured in said conduit so that all liquid flowing through said conduit must pass through said strainer and solids carried by said liquid are intercepted thereby, said strainer including a foraminated wall portion mounted in and extending axially from said annular shoulder and spaced from and generally parallel to the inner wall surface of said conduit to provide an annular chamber therebetween, means on the end of said wall portion remote from said shoulder cooperating with said inner wall to prevent solids from entering said annular chamber, foraminated means comprising converging rods mounted in said annular shoulder exteriorly of said wall portion and extending axially and interiorly through the end of said annular chamber adjacent said shoulder and through said foraminated wall toward the center of said conduit to a region spaced axially from said shoulder to intercept solids carried by the liquid and permit the flow of liquid therethrough, said wall portion and said converging rods intersecting at a level spaced axially from said shoulder to confine the intercepted solids in a region therebetween which is intermediate the length of said strainer, whereby the intercepted solids are held away from said shoulder and out of said annular chamber so that liquid flowing through said conduit may flow through said annular chamber to by-pass said intercepted solids.

4. In combination with a conduit having an internal annular shoulder defining an opening coaxial with said conduit, a strainer secured in said conduit so that all liquid flowing through said conduit must pass through said strainer and solids carried by said liquid are intercepted thereby, said strainer including a foraminated wall portion comprising generally parallel rods mounted in and extending axially from said annular shoulder and spaced from and generally parallel to the inner wall surface of said conduit to provide an annular chamber therebetween, the ends of said parallel rods remote from said shoulder cooperating with said inner wall to prevent solids from entering said annular chamber, foraminated means comprising converging rods mounted in said annular shoulder exteriorly of said wall portion and extending axially and interiorly through the end of said annular chamber adjacent said shoulder and between said parallel rods toward the center of said conduit to a region spaced axially from said shoulder to intercept solids carried by the liquid and permit the flow of liquid therethrough, said parallel rods and said converging rods intersecting at a level spaced axially from said shoulder to confine the intercepted solids in a region therebetween which is intercepted solids are held away from said shoulder and out of said annular chamber so that liquid flowing through said conduit may flow through said annular chamber to by-pass said intercepted solids.

References Cited in the file of this patent

UNITED STATES PATENTS

| | | |
|---|---|---|
| 275,404 | Ohly | Apr. 10, 1883 |
| 1,731,085 | Warren | Oct. 8, 1929 |
| 2,278,178 | Lannert | Mar. 31, 1942 |
| 2,427,320 | Zech | Sept. 9, 1947 |
| 2,658,625 | Rafferty | Nov. 10, 1953 |
| 2,669,358 | Young | Feb. 16, 1954 |
| 2,699,259 | Birkemeier | Jan. 11, 1955 |
| 2,722,316 | Goscilo | Nov. 1, 1955 |

FOREIGN PATENTS

| | | |
|---|---|---|
| 20,584 | Great Britain | Sept. 17, 1906 |
| 126,586 | Great Britain | May 15, 1919 |